No. 719,704. PATENTED FEB. 3, 1903.
C. J. TRAKEL.
FISH HOOK.
APPLICATION FILED APR. 7, 1902.
NO MODEL.
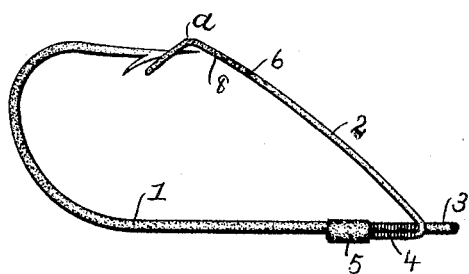
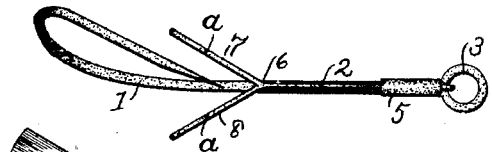
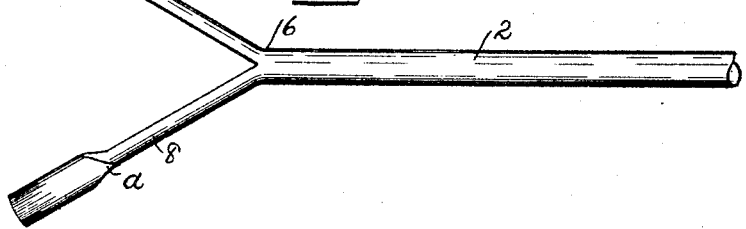
Witnesses.
P. A. Otto
C. L. Roesch.
Inventor
Charles J. Trakel
By Erwin E. Wheeler
Attorneys.

UNITED STATES PATENT OFFICE.

CHARLES J. TRAKEL, OF WAUKESHA, WISCONSIN.

FISH-HOOK.

SPECIFICATION forming part of Letters Patent No. 719,704, dated February 3, 1903.

Application filed April 7, 1902. Serial No. 101,619. (No model.)

*To all whom it may concern:*

Be it known that I, CHARLES J. TRAKEL, a citizen of the United States, residing at Waukesha, county of Waukesha, and State of Wisconsin, have invented new and useful Improvements in Fish-Hooks, of which the following is a specification.

My invention relates to improvements in fish-hooks. It has frequently been attempted to provide fish-hooks with weed-guards; but so far as I am aware no such attempts have been successful, owing to the fact that it has been thought necessary to have the guard engage the point of the hook or project in close proximity to it, with the result that the guard becomes easily disarranged to such an extent as to expose the point of the hook and defeat the purpose for which it is intended.

The object of my invention is to provide a form of guard which does not require an exact adjustment in order to be effective and which will in no case interfere with the engagement of the hook in the jaw of the fish. Regard is also had to the provision of means for permanently securing the guard to the hook-shank.

In the following description reference is had to the accompanying drawings, in which—

Figure 1 is a side view of my invention with the solder partly broken away along a portion of the guard-arm and hook-shank to show the internal wire winding. Fig. 2 is a plan view of the device; and Fig. 3 is a detail view, enlarged, to show the construction of the fork.

Like parts are identified by the same reference characters throughout the several views.

1 represents a fish-hook of ordinary construction. A guard-arm 2 is passed through the eye 3 of the hook and doubled back upon the shank, to which it is secured by means of a winding of fine wire 4 and a covering of solder 5. The fine wire 4 being covered by the solder is protected from rusting or from unwinding in case one of the strands is broken, and both solder and wire coöperate in binding the parts together. From the eye 3 the guard-arm projects toward the point of the hook and is forked at 6 in front of the point and preferably between the line thereof (projected) and the shank, the arms 7 and 8 of the fork passing the line 3 on opposite sides and in advance of the point and extending divergingly and rearwardly to crowns *a* in the rear of the point, and from these crowns the arms extend angularly and divergingly with a downward and rearward trend, substantially equal to that of the barb, as illustrated in Fig. 1. It will thus be obvious that the arms of the fork pass the line of the hook twice—once in front of the point and again in the rear of the point—the pointed extremity of the hook being between and under the crowns *a*. With this construction any weeds striking the single guard-arm 2 are easily deflected to one side or the other and pushed laterally by the diverging fork-arms 7 and 8. Owing to the fact that the guard-arms are so constructed as to protect a considerable space underneath and between them, a considerable disarrangement is possible without exposing the point to weeds. The object of extending the extremities of the forked arms downwardly and rearwardly past the pointed portion of the hook is to avoid interfering with the fish, which would otherwise strike the extremities of the arms, and thus be kept away from the point of the hook.

In constructing the fork the guard-arm 2 is preferably split at its free end and the two parts spread divergingly and bent to form the guards, as illustrated in Fig. 3. It is not essential, however, that the downwardly-extending extremities of the arms should diverge from the crowns *a*.

Having thus described my invention, what I claim as new, and desire to secure by Letters Patent, is—

1. The combination with a fish-hook; of a guard-arm projecting from the hook-shank toward the point of the hook, said arm being forked in front of, and below, the hook-point, with the arms of the fork extending rearwardly and passing the line of the hook on opposite sides and in front of the point.

2. The combination with a fish-hook; of a guard supported from the shank, said guard comprising two arms, each having a portion extending rearwardly past the line of the hook, in front of the point, and having an extremity extending at an angle thereto, past the pointed portion of the hook, with a downward and rearward trend, similar to that of the barb.

3. The combination with a fish-hook; of a guard supported from the hook-shank, and projecting toward the point of the hook, said guard being forked and provided with divergent arms extending rearwardly, passing the line of the hook in front of the point, and having extremities angularly bent and extending past the pointed portion of the hook, on each side thereof, with a downward and rearward trend.

4. The combination with a fish-hook; of a forked guard in front of the hook, extending rearwardly on each side of the line thereof, and with extremities also projecting rearwardly past the pointed portion of the hook, at an angle to that portion in front of the hook; a guard-supporting arm looped through the eye of the hook; a binding-wire securing the arm to the hook-shank; and a covering of solder therefor.

In testimony whereof I affix my signature in the presence of two witnesses.

CHARLES J. TRAKEL.

Witnesses:
V. H. TICHENOR,
EDITH SHERMAN.